United States Patent
Doveri (10) Patent No.: US 10,294,851 B2
(45) Date of Patent: May 21, 2019

(54) MOTORCYCLE ENGINE COOLING APPARATUS

(71) Applicant: Piaggio & C. S.p.A, Pontedera (PI) (IT)

(72) Inventor: Stefano Doveri, Pontedera (IT)

(73) Assignee: PIAGGIO & C. S.P.A., Pontedera (PI) (IT)

(*) Notice: Subject to any disclaimer, the term of this patent is extended or adjusted under 35 U.S.C. 154(b) by 0 days.

(21) Appl. No.: 15/775,349

(22) PCT Filed: Nov. 10, 2016

(86) PCT No.: PCT/IB2016/056766
§ 371 (c)(1),
(2) Date: May 10, 2018

(87) PCT Pub. No.: WO2017/081633
PCT Pub. Date: May 18, 2017

(65) Prior Publication Data
US 2018/0355783 A1 Dec. 13, 2018

(30) Foreign Application Priority Data
Nov. 13, 2015 (IT) .......................... 102015000072407

(51) Int. Cl.
*B60K 11/00* (2006.01)
*F01P 7/10* (2006.01)
(Continued)

(52) U.S. Cl.
CPC .............. *F01P 7/10* (2013.01); *B60K 11/02* (2013.01); *B60K 11/04* (2013.01); *B62J 99/00* (2013.01);
(Continued)

(58) Field of Classification Search
CPC .. B60K 11/08; B60K 11/04; F01P 3/18; F01P 7/10; F01P 11/00
See application file for complete search history.

(56) References Cited

U.S. PATENT DOCUMENTS 4,793,293 A * 12/1988 Minami ................. B60K 11/08
123/41.61
6,971,438 B2 12/2005 Oki et al.
(Continued)

FOREIGN PATENT DOCUMENTS

| EP | 2022658 A1 | 2/2009 |
|---|---|---|
| EP | 2474723 A1 | 7/2012 |
| TW | 200927542 A | 7/2009 |

*Primary Examiner* — Hau V Phan
(74) *Attorney, Agent, or Firm* — Volpe and Koenig, P.C.

(57) ABSTRACT

A cooling apparatus of an internal combustion engine of a water-cooled motor vehicle includes a cooling fan is controlled by the driveshaft faced to a radiator protected by a louver arranged on a side of the vehicle and receiving a substantially tangential air flow, allows improved air penetration through the radiator, the louver having: at least a current rib, parallel to the outer face of the radiator, extending in a direction concurrent with the motion direction, intermediate between the lower and top fastening edges further spaced-apart with respect thereto from the radiator with a C-like section, determining a space between louver and radiator deviating the motion of the air sucked by the fan; and a plurality of blades extending on both sides of the current rib, transversal to the motion direction of the motor vehicle, having a front leading edge, further spaced-apart from the radiator than the respective rear edge.

9 Claims, 5 Drawing Sheets

(51) Int. Cl.
*B60K 11/02* (2006.01)
*B60K 11/04* (2006.01)
*B62J 99/00* (2009.01)
*F01P 3/18* (2006.01)

(52) U.S. Cl.
CPC ............ *F01P 3/18* (2013.01); *B60Y 2200/12* (2013.01); *B60Y 2200/126* (2013.01); *B62K 2202/00* (2013.01); *F01P 2050/16* (2013.01); *F01P 2070/52* (2013.01)

(56) References Cited

U.S. PATENT DOCUMENTS

| | | | | |
|---|---|---|---|---|
| 7,422,081 | B2* | 9/2008 | Dufresne | B60K 11/04 180/68.1 |
| 7,458,343 | B2* | 12/2008 | Tanabe | F01P 11/00 123/41.69 |
| 8,323,134 | B2* | 12/2012 | Tsukada | F16H 61/66259 474/144 |
| 8,671,892 | B2* | 3/2014 | Yamanishi | B60K 11/04 123/41.01 |
| 8,840,496 | B2* | 9/2014 | Yamanishi | B60K 11/08 180/68.1 |
| 8,857,553 | B2* | 10/2014 | Nakamura | F28D 1/00 180/219 |
| 2008/0006458 | A1* | 1/2008 | Yamaguchi | B62K 11/04 180/68.1 |
| 2013/0075178 | A1* | 3/2013 | Petersson | B62J 17/02 180/220 |
| 2014/0238635 | A1* | 8/2014 | Nishimura | F01P 3/18 165/41 |
| 2016/0280059 | A1* | 9/2016 | Hagimoto | B60K 11/04 |
| 2016/0280306 | A1* | 9/2016 | Miyashiro | B62K 11/04 |

* cited by examiner

MOTORCYCLE ENGINE COOLING APPARATUS

The present invention relates to a cooling apparatus of an internal combustion engine of a water-cooled motor vehicle, in particular a scooter, wherein a cooling fan is controlled by the driving shaft faced to a radiator which is protected by a louver arranged on a side of the motor vehicle and which receives a substantially tangential air flow deriving from the forward motion of the motor vehicle.

This cooling apparatus can also be used effectively in the engines for motor vehicle wherein, both the fan, providing for sucking air through a radiator, and an electric generator engine, providing for charging an electric battery, for starting the internal combustion engine and, in case, for supplying driving power when the motor vehicle is of the type with so-called hybrid propulsion, are assembled on the driving axle.

The driving axle is transversal with respect to the longitudinal development of the motor vehicle and then it is horizontal with respect to a plane of travel, as well as perpendicular to a vertical plane which is substantially defined by the rotation plane of the fixed, that is not steering, rear wheel, when the motor vehicle travels according to a straight line. Electric engine, fan, radiator and related louver are then received on the same side of the engine at an end of the driving shaft which is controlled in rotation by one or more pistons; the opposite end of the driving shaft is then connected to the organs transmitting the motion to the driving rear wheel. In the motor vehicle, a double rear wheel could be also provided in a solution which is not herein described, but which can comprise the herein described cooling apparatus.

The positioning of the louver of the above-described radiator makes that it is not invested with air frontally, but tangentially. The air required for cooling the radiator cooling water is then sucked by a fan the axis thereof basically is perpendicular to the air flow deriving from the forward motion of the motor vehicle.

Considering that the rotation regime of the fan does not depend directly upon cooling requirements, as it usually takes place in an automobile engine wherein the fan is controlled by a dedicated electric motor, but it is identical to the engine rotation regime, so that the radiator could be always adequately cooled down, the fan prevalence has to assume suitable values upon planning.

This requirement then could determine an oversizing of the fan blades which, on one side, could increase excessively the sizes of the cooling apparatus transversal with respect to the motor vehicle and, on the other side, they could decrease the overall performance of the engine, considering that most part of the driving force, above all supplied at high regimes, would benefit the fan motion.

The U.S. Pat. No. 6,971,438 describes a cooling apparatus as above illustrated, wherein the louver is substantially parallel to the radiator, in a configuration wherein the above-highlighted drawback could appear.

In the light of this need, the European patent application N. 2,474,723 describes a cooling apparatus wherein the louver is tilted so that a transversal projection thereof with increased sizes is faced towards the motion direction, so as to intercept partially the air flow deriving from the vehicle motion.

However, this arrangement could decrease the aerodynamic effectiveness of the vehicle, and in fact such louver has transversal blades arranged so as to form a flat surface on the louver, practically obstructing the air passage, even to prevent dirt, water or powder from penetrating the inside of the compartment of the radiator closed by the louver itself.

On the contrary, the European patent application N. 2,022,658 and the patent application in Taiwan N. TW 200 927 542 A describe a cooling apparatus of the above-described type, wherein the louver is separated into two portions by a vertical rib, lifted with respect to the front and rear edges of the louver. In this way, under the louver an empty space is formed wherein the air has the possibility of changing direction by the effect of the sucking force of the fan, and a portion of the louver has a transversal projection thereof faced towards the motion direction, so as to intercept partially the air flow deriving from the vehicle motion.

Even in this case, however, both problems of aerodynamic type and the risk that dirt or powder could penetrate the radiator area under the protection louver could be present.

The technical problem underlying the present invention is to provide a cooling apparatus for an internal combustion engine of a motor vehicle allowing to obviate the drawbacks mentioned with reference to the known art.

Such problem is solved by a cooling apparatus as above specified, and as defined in the enclosed claim 1.

The main advantage of the cooling apparatus according to the present invention lies in the fact of allowing an improved penetration of air through the radiator, thus by avoiding the oversizing of the fan.

The present invention will be described hereinafter according to a preferred embodiment example, provided by way of example and not for limitative purposes by referring to the enclosed drawings wherein.

By referring to the figures, a motor vehicle is represented partially: it is of the scooter type with a saddle for the driver and a passenger and with a resting platform 20 for the driver's feet, connected to a frame.

The motor vehicle comprises a propulsion unit 1 (FIGS. 2, 3A, 3B and 4A) having an engine block in a single piece receiving a cylinder and a related piston, and having on the top an outlet box 30. The propulsion unit 1 then incorporates an internal combustion engine of the water-cooled type. In the figures a forward motion direction F of the motor vehicle is highlighted, based thereupon a right side of the motor vehicle, which is represented in FIG. 1, and a left side is defined.

Figure 1:
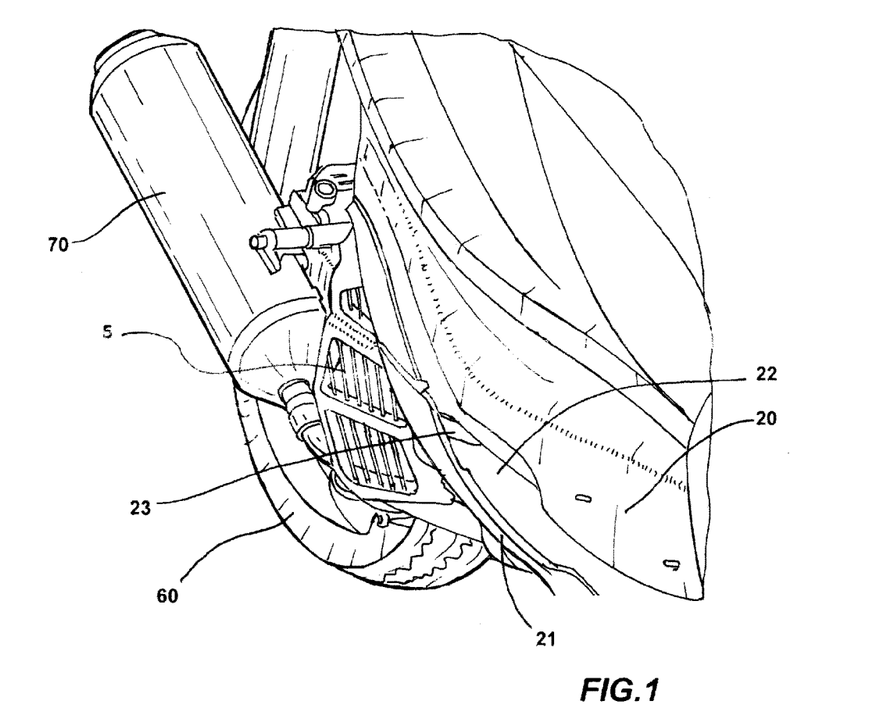
FIG. 1 shows a perspective side and partial view of a motor vehicle incorporating a cooling apparatus of the engine of a motor vehicle according to the present invention, a protection louver of the radiator thereof can be seen.
Figure 2:
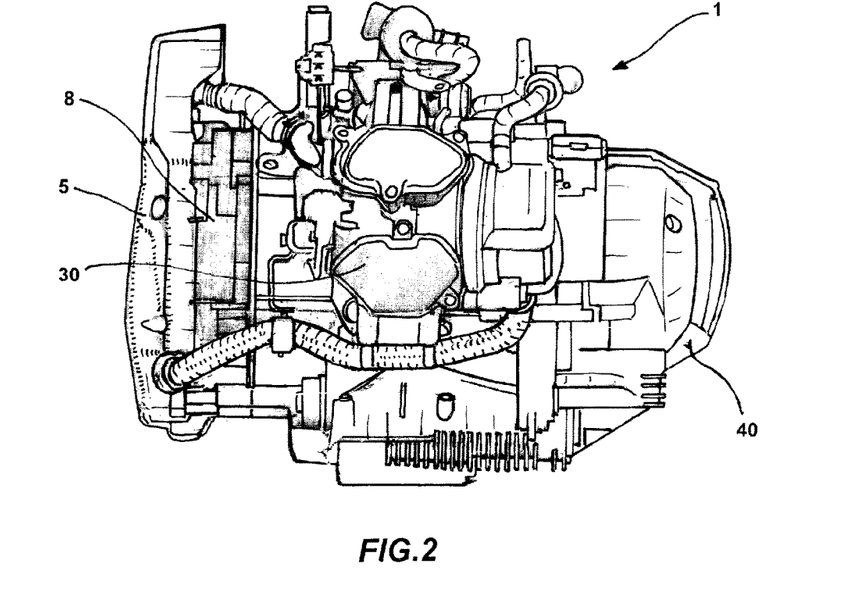
FIG. 2 shows a front view of the propulsion unit of the motor vehicle of FIG. 1, incorporating a cooling apparatus of the engine of a motor vehicle according to the present invention.
Figure 3A:
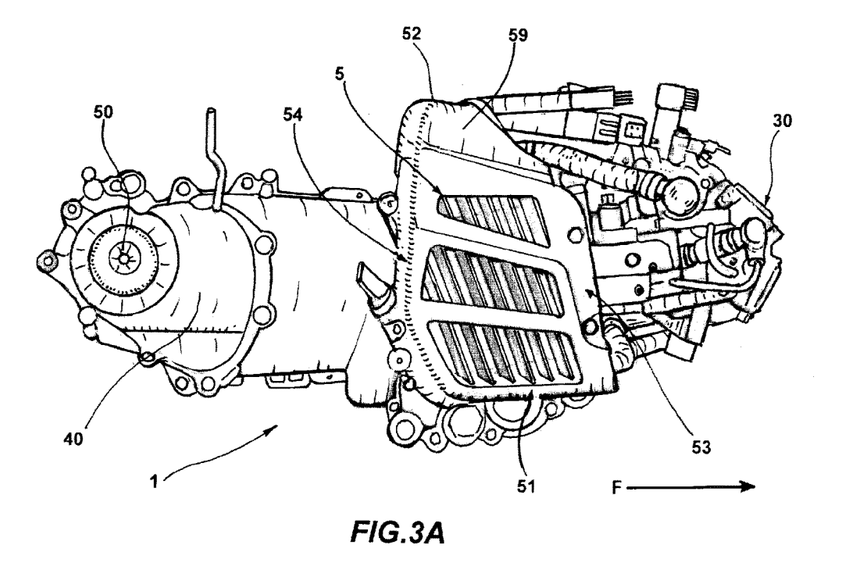
FIG. 3A shows a side view of the propulsion unit of FIG. 2, at the side thereon said cooling apparatus is arranged, wherein said louver can be seen.
Figure 3B:
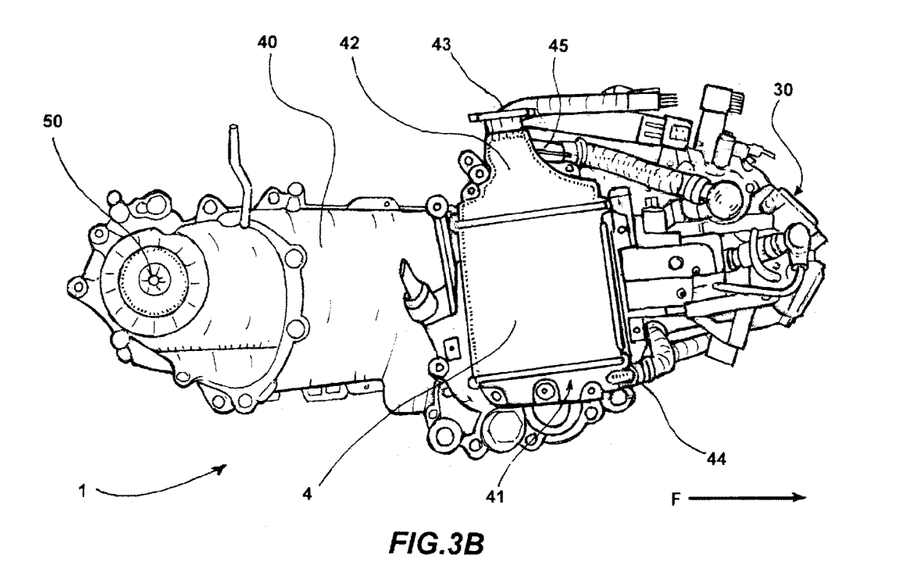
FIG. 3B shows a side view of the propulsion unit of FIG. 2 analogous to the preceding figure, wherein the louver is removed.
Figure 4A:
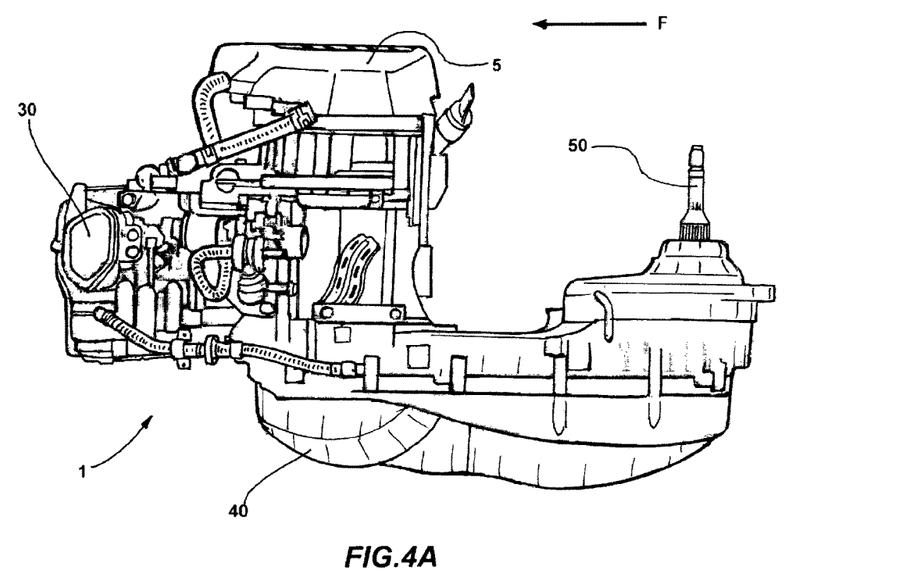
FIG. 4A shows a plan view of the propulsion unit of the motor vehicle of FIG. 1, incorporating a cooling apparatus of the engine of a motor vehicle according to the present invention.
Figure 4B:
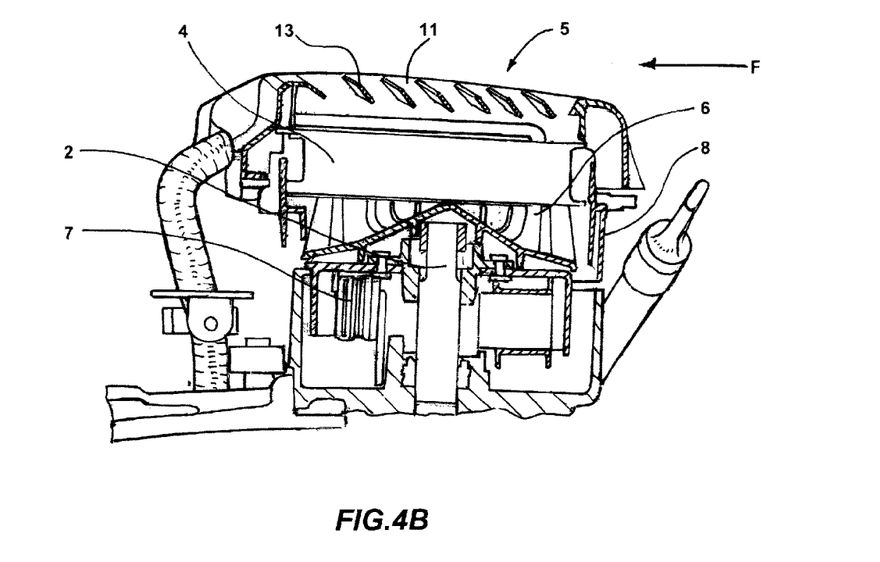
FIG. 4B shows an enlarged detail of the preceding figure, highlighting the components of a cooling apparatus according to the invention.
Figure 5:
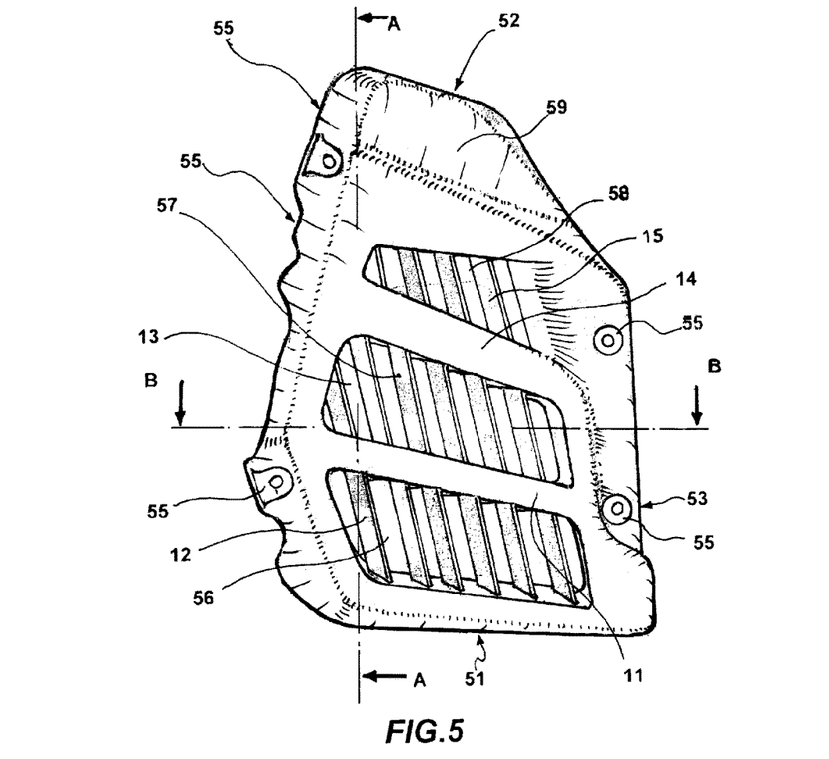
FIG. 5 shows a view of the above-mentioned louver, assembled on a radiator of the cooling apparatus according to the invention.

At the left side of the motor vehicle, the propulsion unit 1 comprises transmission organs encompassed in a transmission carter 40; it extends from the engine to an axis 50 (FIGS. 3A, 3B and 4A) of rear wheel 60 (FIG. 1).

At the right side of the motor vehicle the propulsion unit 1 comprises a cooling apparatus, which will be detailed hereinafter, and a discharge duct 70.

It is to be meant that right side and left side are herein used conventionally: in the structural practice the respective organs could be even specularly exchanged.

The propulsion unit 1 comprises a driving shaft 2, dragged in rotation by the effect of the reciprocating motion of the piston inside the engine.

The driving shaft 2 is transversal with respect to the longitudinal development of the motor vehicle and then it is horizontal with respect to a plane of travel, as well as perpendicular to a vertical plane which is substantially defined by the rotation plane of the fixed, that is not steering, rear wheel 60, when the motor vehicle travels according to a straight line.

In the present example of cooling apparatus, a cooling fan 6 is directly keyed on the driving shaft 2, faced to a radiator 4 which is protected by a louver 5 arranged on the right side of the motor vehicle and which receives a substantially tangential air flow deriving from the forward motion of the motor vehicle.

The direct keying of the fan 6 assumes a particular case of fan which is controlled in rotation by the driving shaft, in not autonomous way by the rotation regime of the engine itself.

In particular, in the present embodiment example, both the fan 6, providing for sucking air through the radiator, and an engine-electric generator 7, providing for charging an electric battery, for starting the internal combustion engine and, in case, for supplying driving force when the motor vehicle is of the type with so-called hybrid propulsion, are assembled on said driving shaft 2.

Electric engine, fan, radiator and related louver are then received on the same side of the engine at an end of the driving shaft 2; the opposite end of the driving shaft 2 is then connected to the previously mentioned transmission organs.

Figure 8:
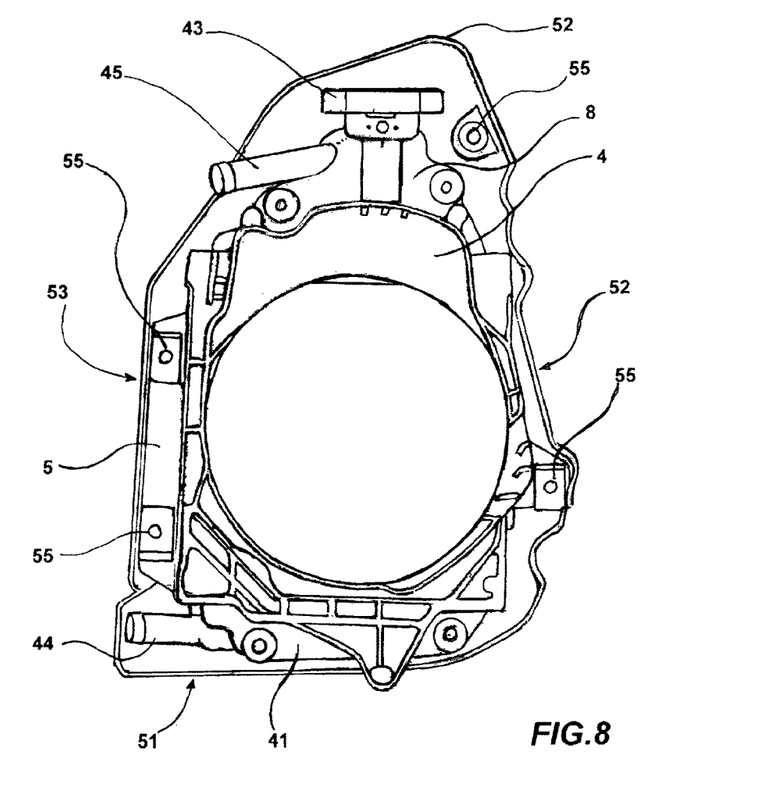
FIG. 8 shows a view of the louver—radiator—fan box group from the opposite side with respect to FIG. 5.

The fan 6 is encompassed in a casing 8 which is arranged between radiator 4 and electric motor 7: this casing has a wide central opening corresponding to the face of the radiator 4 opposite to the one faced towards the louver 5 (FIG. 8); through this opening, and through the radiator 4 having a plurality of through slots not visible in figures, the air is sucked.

Figure 6:
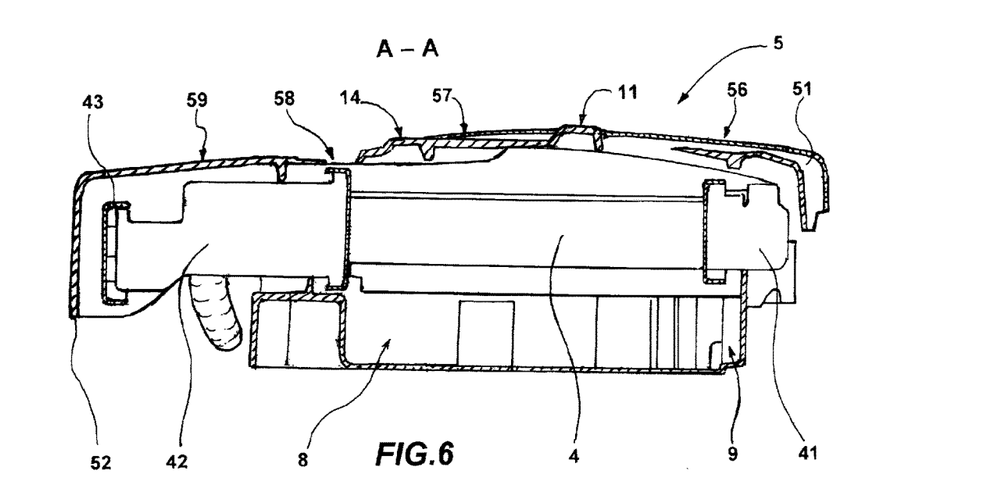
FIG. 6 shows a section view of the louver—radiator—fan box group, according to the plane A-A of FIG. 5.
Figure 7:
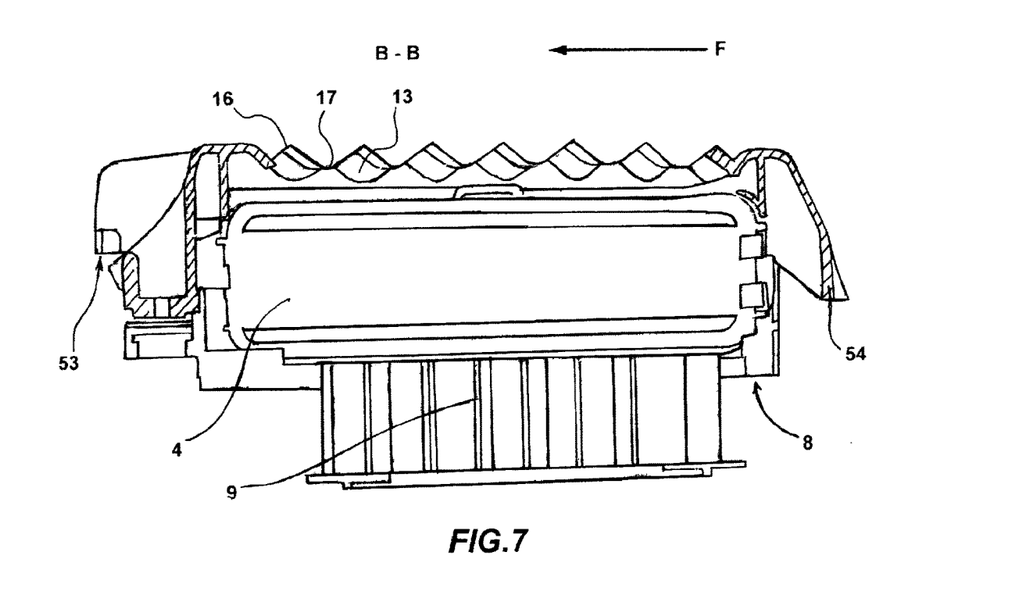
FIG. 7 shows a section view of the louver—radiator—fan box group, according to the plane B-B of FIG. 5.

The heated air flow is then discharged through the side walls of the casing 8 of the fan 6, in particular through an opening faced downwards and equipped with fins 9 (FIGS. 6 and 7).

It is to be noted that what described so far can relate both a scooter with a steering front wheel and with a fixed rear wheel and a scooter of the type with three wheels, with a pair of swiveling front wheels and a fixed rear wheel. However, in the motor vehicle even a double rear wheel could be provided in a solution which is not herein described but which can comprise the herein described cooling apparatus.

By focusing on the cooling apparatus, said louver 5 has a lower fastening edge 51, a top fastening edge 52, a front fastening edge 53, connecting to the top fastening edge 52 with a tilted upper tract, and a rear fastening edge 54, divided into two slightly tilted tracts. The lower fastening edge 51, the front fastening edge 53 and the rear fastening edge 54 have respective fastening holes 55 intended to be engaged by screws. The above-mentioned edges are bent to form, with the exposed face of the louver, an open container which is fastened at the radiator 4 thereto the concavity of the louver 5 is faced.

From the bottom to the top, the louver 5 is substantially divided into four transversal portions: it has a lower open portion 56, an intermediate open portion 57 and an upper open portion 58, all extending from the front fastening edge 53 to the rear fastening edge 54. Moreover, the louver 5 has a top close portion 59 as fourth portion.

The louver 5 comprises a first main current rib 11 extending in a direction concurrent with the motion direction of the motor vehicle, with the rear end lifted upwards with respect to the front end. It is in an intermediate position between said lower fastening edge 51 and top fastening edge 52, it extends from the front fastening edge 53 to the rear fastening edge 54 between said lower open portion 56 and intermediate open portion 57.

The louver 5 comprises a plurality of blades extending on both sides of said first current rib 11, transversal to the motion direction of the motor vehicle.

In particular, said lower open portion 56 has first blades 12 extending vertically from the lower fastening edge 51 to the first rib 11; said intermediate open portion 57 has second blades 13 extending vertically from said first rib 11 to a second current rib 14; the latter, as the previous one, is in an intermediate position between said lower fastening edge 51 and top fastening edge 52, it extends from the front fastening edge 53 to the rear fastening edge 54 between said intermediate open portion 57 and upper open portion 58. Even the second current rib 14 has a rear end thereof lifted upwards with respect to the front end.

Even the upper open portion 58 has then third blades 15 extending vertically from the second current rib 14 to the top close portion 59.

All blades 12, 13, 15, forming together a substantially shutter-like structure, have a front leading edge 16 which is more spaced-apart from the radiator 4 than the respective rear edge 17 (FIG. 7). In other words, with respect to a vertical plane which is parallel to the face of the radiator 4 faced towards the louver 5 and thereto the position of the main surface of the louver 5 substantially corresponds, the blades 12, 13, 15 are tilted clockwise if seen from top (FIG. 7) and in this way the surface of the blades is arranged so as not to hinder the air flow, on the contrary to invite it in the space below the louver 5.

Moreover, said first current rib 11 is in a more spaced-apart position from the radiator with respect to the lower fastening edge 51 and top fastening edge 52. In this regard, the first rib 11, as well as in case the second rib 14, has a C-like section with the concavity faced towards the radiator 4, so as to increase the height of the empty space comprised therebetween and the radiator 4.

This concavity further addresses the tangential component of the air flow towards the rear fastening edge wherein it is definitively deviated.

In this way, the whole surface of the radiator 4 is bathed by an air flow in an uniform way and with a substantial reduction in the pressure losses. Moreover, this rib determines between louver 5 and radiator 4 a space 10 deviating the motion of the air sucked by the fan 6.

Such deviation space 10 substantially is in a position corresponding to the opening of the casing 8 of the fan 6, so as to constitute a path with less aerodynamic resistance crossing transversally the radiator 4.

The current ribs 11, 14 are substantially parallel to the plane defined by the surface of the radiator 4 faced thereto: the distance between them and said surface, defining said empty space, is constant if seen along the direction F defining the forward motion of the motor vehicle.

In the present example, the second current rib 14 substantially is at the same level with respect to the lower fastening edge 51 and top fastening edge 52, but optionally it could be lifted, too, with respect to the radiator 4.

By now referring to the radiator 4, it has a lower manifold 41, substantially corresponding to said lower fastening edge 51, and a top manifold 42 equipped with a lid 43.

In the present example, the closed top portion 59 of the louver 5 overlaps the upper manifold 42 and the lid 43 by hiding them completely, also with the help of the upper fastening edge 52 which is folded up to hide the lid 43.

This arrangement prevents the lid from opening accidentally, as well as from being possibly broken-in, and prevents these portions, which are metallic and show high temperature upon operating, from burning driver or passenger.

As already highlighted, the radiator 4 has a box-like shape having a surface exposed to the air flow addressed through said louver 5, surface which is substantially vertical and parallel to the forward motion direction F of the motor vehicle.

Moreover, the radiator 4 is tilted in rear direction, so that the lower manifold 41 of the radiator 4 is in front position, exceeded with respect to the top manifold 42 of the radiator 4.

The lower manifold 41 and the top manifold 42 of the radiator 4 have respective discharge duct 44 and intake duct 45 which are both arranged on the front side of the radiator 4, at the front fastening edge 53.

By referring to FIG. 1, the motor vehicle has a respective frame comprising, near the louver 5, a resting platform 20 for the driver's foot (FIG. 1).

Below the platform 20, the motor vehicle comprises a side shroud 21 helping to make the above-described cooling apparatus to operate.

To this purpose, below the platform, the body of the motor vehicle has a shape so as to have a tubular concavity extending longitudinally. The side shroud 21 overlaps said tubular concavity and defines, below said platform 20 and on the side of said louver 5, an air channel having an inlet mouth 22, faced towards the front direction with respect to the forward motion direction F of the motor vehicle, and an air output opening 23 faced towards said louver 5.

In this way the channel has a longitudinal development substantially tangential to the exposed surface of the louver 5 and parallel to the first current rib 11.

It then divides and slows down the air flow penetrating the space 10 therebelow.

In this regard, the first rib 11, as well as in case the second rib 14, has a C-like section with the concavity faced towards the radiator 4, so as to increase the height of the empty space comprised therebetween and the radiator 4.

This concavity further addresses the tangential component of the air flow towards the rear fastening edge wherein it is definitively deviated.

In this way, the whole surface of the radiator 4 is bathed by an air flow in a uniform way and with a substantial decrease in the pressure losses.

Moreover, between radiator 4 and casing 8 of the fan 6 no particular sealings are required for addressing the air flow.

To the above-described cooling apparatus a person skilled in the art, with the purpose of satisfying additional and contingent needs, could introduce several modifications and variants, all however comprised within the protective scope of the present invention, as defined by the enclosed claims.

The invention claimed is:

1. A cooling apparatus of an internal combustion engine of a water-cooled motor vehicle, wherein a cooling fan (6) is controlled by the driving shaft (2) faced to a radiator (4) which is protected by a louver (5) arranged on a side of the motor vehicle and receiving a substantially tangential air flow, deriving from the forward motion of the motor vehicle, said louver (5) having a lower fastening edge (51) and a top fastening edge (52), wherein:

said louver (5) comprises at least a current rib (11) extending in a direction concurrent with a motion direction (F) of the motor vehicle, intermediate between said lower fastening edge (51) and a top fastening edge (52) and more spaced-apart with respect thereto from the radiator (4), having a C-like section with the concavity faced towards the radiator (4), so as to increase the height of the empty space comprised therebetween and the radiator (4) so as to determine between the louver (5) and radiator (4), a space deviating the motion of the air sucked by the fan (6); and said louver (5) comprises a plurality of blades (12, 13) extending on both sides of said current rib (11), transversal to the motion direction (F) of the motor vehicle, having a front leading edge (16) which is more spaced-apart from the radiator (4) than the respective rear edge (17), said at least a current rib (11) being substantially parallel to the plane defined by the surface of the radiator (4) faced thereto, so that the distance between them and said surface, defining said empty space (10), is constant if seen along the motion direction (F) defining the forward motion of the motor vehicle.

2. The cooling apparatus according to claim 1, wherein in the motor vehicle the frame comprises a resting platform (20) for a driver's foot and wherein a side shroud (21) is provided defining, below said platform (20) on a side of said louver (5), an air channel having an inlet mouth (22), faced towards the front direction with respect to the forward motion direction (F) of the motor vehicle, and an air output opening (23) faced towards said louver (5), said channel having a longitudinal development substantially tangential to the exposed surface of the louver (5) and parallel to said current rib (11).

3. The cooling apparatus according to claim 1, wherein the radiator (4) has a lower manifold (41) substantially corresponding to said lower fastening edge (51), and a top manifold (42) equipped with a lid (43), the louver (5) having a closed top portion (59) overlapping the upper manifold (42) and the lid (43) by hiding them completely.

4. The cooling apparatus according to claim 1, wherein the radiator (4) has a box-like shape having a surface exposed to the air flow addressed through said louver (5), vertical and parallel to the forward motion direction (F) of the motor vehicle, and tilted in a rear direction so that the lower manifold (41) of the radiator (4) is in a front position with respect to the top manifold (42) of the radiator (4).

5. The cooling apparatus according to claim 4, wherein the lower manifold (41) of the radiator (4) and the top manifold (42) of the radiator (4) have respective discharge and intake ducts (44, 45) both arranged on the front side of the radiator (4).

6. The cooling apparatus according to claim 1, wherein the fan (6) is encompassed in a casing (8) which is arranged between radiator (4) and electric motor (7) and comprises:
   a central opening corresponding to the face of the radiator (4) opposite to the one faced towards the louver (5);
   an opening in the side walls of the casing (8) faced downwards and equipped with fins (9).

7. The cooling apparatus according to claim 1, wherein the louver (5) is substantially divided into four transversal portions from the bottom to the top: a lower open portion (56), an intermediate open portion (57), an upper open portion (58), and a top closed portion (59), all extending from a front fastening edge (53) to the rear fastening edge (54), said current rib (11) being positioned between the lower open portion (56) and the intermediate open portion (57), extending from the front fastening edge (53) to the rear fastening edge (54), the upper open portion (58) having additional blades (15) extending vertically from an additional current rib (14) to the top closed portion (59).

8. The cooling apparatus according to claim 1, wherein the fan (6) is directly keyed on the driving shaft (2).

9. A motor vehicle including a cooling apparatus of claim 1.

\* \* \* \* \*